(12) United States Patent
Chawla et al.

(10) Patent No.: US 10,524,612 B2
(45) Date of Patent: Jan. 7, 2020

(54) APPARATUS AND METHOD FOR MAKING TEA LATTE

(71) Applicant: CAMELLIA LABS INC, San Mateo, CA (US)

(72) Inventors: Gaurav Chawla, San Mateo, CA (US); Matt Leanse, San Mateo, CA (US); Peter A Relan, San Mateo, CA (US)

(73) Assignee: Camellia Labs Inc., San Mateo, CA (US)

( * ) Notice: Subject to any disclaimer, the term of this patent is extended or adjusted under 35 U.S.C. 154(b) by 551 days.

(21) Appl. No.: 15/221,400

(22) Filed: Jul. 27, 2016

(65) Prior Publication Data

US 2017/0027377 A1      Feb. 2, 2017

Related U.S. Application Data

(60) Provisional application No. 62/198,064, filed on Jul. 28, 2015.

(51) Int. Cl.
| | | |
|---|---|---|
| *A47J 31/44* | (2006.01) | |
| *A47J 31/56* | (2006.01) | |
| *A47J 31/06* | (2006.01) | |
| *A47J 31/46* | (2006.01) | |

(52) U.S. Cl.
CPC ........... *A47J 31/56* (2013.01); *A47J 31/0615* (2013.01); *A47J 31/4485* (2013.01); *A47J 31/4496* (2013.01); *A47J 31/467* (2013.01); *A47J 31/0605* (2013.01)

(58) Field of Classification Search
CPC . A47J 31/0615; A47J 31/0605; A47J 31/4496
USPC .................. 99/287, 323.1, 290, 299, 307
See application file for complete search history.

(56) References Cited

U.S. PATENT DOCUMENTS

| | | | | |
|---|---|---|---|---|
| 3,530,787 | A * | 9/1970 | Litterio ............... | A47J 31/0573 392/472 |
| 4,634,838 | A * | 1/1987 | Berz .................... | A47J 31/0576 222/146.5 |
| 6,192,785 | B1 * | 2/2001 | Trida ...................... | A47J 31/41 99/275 |
| 7,533,602 | B2 * | 5/2009 | Fukushima ........... | A47J 31/401 99/286 |
| 2010/0166928 | A1 * | 7/2010 | Stamm ..................... | A23F 3/18 426/435 |
| 2010/0203209 | A1 * | 8/2010 | Fishbein ................. | A47J 31/18 426/433 |
| 2011/0041704 | A1 * | 2/2011 | Feierabend ......... | A47J 43/0465 99/323.1 |

\* cited by examiner

*Primary Examiner* — Reginald Alexander

(57) ABSTRACT

An apparatus includes a body, a removable first container for water for positioning on the body, a boiler within the body receives water from the first container, a heater adjacent to the boiler heats the water in accordance with at least one preparation parameter. The apparatus further includes a removable second container that is a combination milk carafe and boiler for positioning on the body and a separate heater adjacent to the milk carafe and boiler for heating the milk in accordance with at least one preparation parameter. A filter and a dispensing valve are controlled electronically. An interface and display for entering brewing parameters and a microcomputer for the controlling the apparatus.

12 Claims, 5 Drawing Sheets

Fig 4

APPARATUS AND METHOD FOR MAKING TEA LATTE

RELATED APPLICATIONS

This patent application claims the benefit of U.S. Provisional Patent Application No. 62/198,064 to Chawla et al., filed on Jul. 28, 2015, the content of which is incorporated herein by reference in its entirety.

FIELD OF THE INVENTION

The present invention relates generally to the field of beverage preparation. More particularly, the present invention relates to an automated device for making tea latte, which includes the capability to use pre-packaged pods containing tea leaves and spices for the preparation of tea latte.

BACKGROUND

The problem the present invention addresses is automating the process by which tea latte is brewed and prepared.

Tea latte is a combination of tea and milk. Masala chai (Indian spiced chai-tea latte) comprises water, milk, loose tea, various spices and sweetener. Spices used to make chai tea may include ginger, cardamom, pepper, cinnamon, mint, lemon grass, cloves, star anise, fennel seeds, saffron, nutmeg, coriander, basil, licorice, rose, etc.

Tea latte is typically prepared through a manual process. It would be desirable to at least partially automate the process of preparing tea latte. The traditional manual preparation process for tea latte is a process whereby water and milk is boiled, either together or separately, and to which fresh tea leaves and spices are added. The tea is then allowed to brew by immersion for a selected period of time, after which the mixture is filtered and served.

The obvious problem of the traditional manual process of preparing tea latte is the effort and attention needed to brew good quality tea latte and to do it in a consistent and repeatable way. Additionally, cleaning required significant effort, as the vessels used are not specifically designed for brewing tea latte.

The current marketplace contains some devices that attempt to automate the process of creating tea latte. However these devices are almost always repurposed automated coffee brewing devices that have been repurposed in attempt to use them to brew tea latte.

Problems with current automated solutions to brew tea latte include but are not limited to the following:

(1) Current devices for brewing tea latte use flow-through brewing instead of immersion brewing, whereas immersion brewing is the optimal method for brewing tea-latte;

(2) Current devices do not include automated methods for frothing fresh milk and adding it to the tea-spice mixture;

(3) Current pod-based devices for brewing tea latte use dried milk powder not fresh milk;

(4) Current pod-based devices for brewing tea latte use instant tea instead of tea leaves;

(5) Current devices for brewing tea latte were originally designed for brewing coffee, which has different temperature and time requirement than those required for tea latte.

In addition, while there are several current automated solutions U.S. Pat. Nos. 9,107,533, 8,733,234, and 7,669,517 that address sub-components of the problem for heating and frothing milk they differ from and are less efficient than the present invention in several important ways.

U.S. Pat. No. 9,107,533 describes a standalone milk foamer with a magnetic frothing mechanism. A key different between U.S. Pat. No. 9,107,533 and the present invention is that the present invention uses a planar linkage instead of a protrusion linkage between the magnetic frothing drive mechanism and the frothing mechanism inside the carafe. This means that in U.S. Pat. No. 9,107,533 there is a hollow pin formed into the bottom of the carafe that must be aligned with a protrusion in the base of the frothing drive unit to properly function. This is because U.S. Pat. No. 9,107,533 relies on a diametric magnetic linkage to drive their frother, in which the frother driver fits within the inner diameter of the frother itself. Whereas in the present invention a planar magnetic linkage is utilized between frother and drive. Which means that there are no protrusions the need to be aligned for the frother to function properly. Rather a gross indexing feature consisting of a dish-shaped relief consisting of a slight ramp around the edges of the carafe is used to get the carafe closely enough aligned so that the magnets in the frother inside the carafe and the magnetic drive mechanism housed in the base can couple properly. The benefits of the method of the present invention is the operator does not need to align the carafe to the protrusion. It also allows a design that supports simply sliding or putting the carafe in place which the method of U.S. Pat. No. 9,107,533 does not support. Also the lack of protrusions in the present invention means the unit is easier to clean.

Additionally, U.S. Pat. No. 9,107,533 describes a system where a cuff and stacked coil induction heater is utilized. This means that the carafe has to be lifted up and then dropped several inches into a recessed bucket for the induction heater to couple with the carafe properly. This contrasts with the present invention where the carafe is simply slid into place by the user and only drops down by itself a few millimeters into the shallow dish-shaped relief that the carafe sits in.

Not only do these two improvements provide a distinct benefit to the ease of use but they also improve the ability to clean the unit. In the present invention there are no large protrusions that have to be cleaned around or deep vertical walls. Rather the present invention with a shallow dish-shaped relief that the carafe sits in, is free from any major interruptions to the surface. This means that it is easy to wipe clean.

U.S. Pat. No. 8,733,234 describes a frother that uses steam to froth milk not a magnetic drive mechanism used by the present invention. Frother that use steam to froth milk usually require operator intervention, whereas the magnetic driven frother mechanism of the present invention is entirely automated.

U.S. Pat. No. 7,669,517 describes a frother with a vertical axis that is offset from the median vertical axis. In contrast the present mechanism utilizes a frother with a centered vertical axis. This centered vertical axis of the present invention, allows the present invention to optimally use an induction heater, which to some extent relies on concentricity of the fields produced and the target to be heated for optimal efficiency. Additionally, the present invention in one embodiment of the present invention, is therefore free from mechanical constraints that would otherwise require the intentional reduction of the height of the vortex created during the milk frothing process. Therefore, the present has less constraints on vortex height than the invention described in U.S. Pat. No. 7,669,517.

In summary, the problem of providing an automated device that automates the process of creating tea-latte in a way that mimics the quality and expertise of manual methods has not been solved. Thus, there is a need for a device that automates the process of creating high quality tea-latte in a repeatable way and makes cleaning and maintenance easier.

SUMMARY

Embodiments of the present invention pertain to an apparatus and method that automates the way in which tea latte is made.

The approach of the present invention is to automate the process and methods used to create high quality tea latte in a repeatable manner and reduce cleaning and maintenance tasks. The present invention is distinct from other current solutions in several important aspects.

The present invention can brew tea latte using freshly brewed tea and fresh milk. The present invention is designed specifically for the brewing of tea latte and is not a re-purposed coffee maker as is the case for other current solutions.

The present invention steeps tea via immersion in hot water, rather than the flow through method that is typical of other machines.

Additionally, the present invention is designed to accept purpose-specific tea pods, containing loose tea and spices that will drop into the boiler, presenting a benefit for tea brewing over space-constrained flow through coffee pods. Only when loose tea is allowed an unconstrained space to open and bloom can high quality tea latte be achieved. Current solutions with space-constrained flow through coffee pods do not allow enough space for the tea to open and properly brew.

Due to these reasons and others, no other current automated device can consistently produce fully flavored and high quality tea latte that can be achieved with the present invention.

In one embodiment of the present invention, the automation of the manual methods and processes of an expert tea latte maker, is accomplished with a programmable microprocessor which controls the various device sensors and actuators based on custom developed software for the present invention. The microprocessor is at the heart of the device providing the automated control and monitoring of the brewing process.

According to one embodiment of the present invention an apparatus includes a body, a removable first container for water for positioning on the body and a removable second container for milk for positioning on the body. An interface is positioned on the body to accept preparation parameters for tea latte from the user of the device. A boiler within the body receives water from the first container and milk from the second container. In one embodiment of the present invention a removable sieve is placed within the boiler for containing the tea and spices during the brewing process is inserted. In one embodiment of the present invention a single tubular heater adjacent to the boiler heats the water and the milk in accordance with at least one preparation parameter. In one embodiment of the present invention the boiler is a thin thermal vessel designed to decrease time to raise temperature and is therefore more energy efficient. In one embodiment of the present invention the power of the heater is controller by a PID or fuzzy logic controller with inputs from a thermistor embedded in the body of the boiler. A temperature sensor measures the temperature of the liquid inside the boiler. An electronically controlled valve controls the flow of the liquid from the boiler. A magnet activated frothing wheel is mounted to the body for frothing of milk and the final mixing of the brewed tea, spices and milk. In one embodiment of the present invention a microprocessor via the use of various sensors and actuators monitors and controls all actions of the sub-components within the present invention. In one embodiment of the present invention is the apparatus is designed to accept purpose-specific tea pods, containing loose tea and spices that will drop into the boiler, presenting a benefit for tea brewing over space-constrained flow through coffee pods. In one embodiment of the present invention, a Wi-Fi component is included within the apparatus for communication to external devices and systems such as mobile devices and the internet cloud. In one embodiment of the present invention the milk carafe is treated with a non-stick coating to aid in manual or automatic dishwashing.

According to another embodiment of the present invention an apparatus includes a body, a removable first container for water for positioning on the body and a removable second container that is a combination milk carafe and boiler for positioning on the body. An interface is positioned on the body to accept preparation parameters for tea latte from the user of the device. Two boilers and heaters are contained within the body. The first boiler receives water from the first container. The second boiler receives milk from the second container. In one embodiment of the present invention a removable sieve is placed within the first boiler for containing the tea and spices during the brewing process is inserted. In one embodiment of the present invention two heaters are provided. The first heater is a tubular heater adjacent to the boiler that heats the water in accordance with at least one preparation parameter. The second heater is an induction heater adjacent to the boiler that heats the milk in accordance with at least one preparation parameter. In one embodiment of the present invention both boilers are thermally and otherwise functionally optimized for their individual tasks, and therefore require reduced heat up times compared to off the shelf vessels that are often used for brewing tea latte. In one embodiment of the present invention the power of the heater is controller by a PID or fuzzy logic controller with inputs from a thermistor embedded in the body of the boiler. A temperature sensor measures the temperature of the liquid inside the boiler. An electronically controlled valve controls the flow of the liquid from the boiler. In one embodiment of the present invention after the tea and spices have been brewed in the first boiler an electronically controlled valve controls their flow into the second boiler containing the milk. A magnetically driven or directly mechanically driven frothing wheel is mounted to the body under the second boiler for milk for the frothing of milk and the final mixing of the brewed and strained tea latte and milk. In one embodiment of the invention after the final brewing the brewed tea latte is drained through an electronically controlled valve into the milk container, from which it is then served. In one embodiment of the present invention a microprocessor via the use of various sensors and actuators monitors and controls all actions of the sub-components within the present invention. In one embodiment of the present invention is the apparatus is designed to accept purpose-specific tea pods, containing loose tea and spices that will drop into the boiler, presenting a benefit for tea brewing over space-constrained flow through coffee pods. In one embodiment of the present invention, a Wi-Fi component is included within the apparatus for communication to external devices and systems such as mobile devices and the internet cloud. In one embodiment of the present invention the milk carafe is treated with a non-stick coating to aid in manual or automatic dishwashing.

According to one embodiment of the present invention when the invention contains a single boiler to boil both water and milk together, the process flow for brewing tea latte is as follows:

1. The user first selects a recipe using display. The recipe may be custom made directly before brewing or preloaded and saved to the device.

2. When the recipe is selected the user will be prompted to fill the milk carafe to a designated level, fill the water tank if empty and insert a tea pod into the pod mechanism. Optionally loose tea and spices may be added in lieu of using a pre-packaged pod containing tea and spices.

3. After the pod is inserted and the lid is closed, the machine will pump the selected volume of water from the reservoir to the boiler using a pump and flow meter under the control of the programmable microprocessor of the device. The machine will then pump the selected volume of milk from the reservoir to the boiler using a pump and flow meter under the control of the programmable microprocessor of the device.

4. The water, tea leaves, spices and milk will then he heated together using a tubular heater, until the extraction level reaches the level dictated in the recipe. The extraction level is dictated by brew time and temperature as specified in the selected recipe.

5. When both the tea and the milk are sufficiently processed, the tea mixture may be briefly mixed with the magnet frothing device and the machine will default to a "keep hot" mode.

6. The user will be prompted to remove the pod and remove and clean the sieve.

7. The device will be ready for another cycle when the sieve and carafe are sufficiently cleaned, the pod has been removed and the water reservoir is suitable full.

According to one embodiment of the present invention when the invention contains separate boilers, one for water and tea, and one for milk, the process flow for brewing tea latte is as follows:

1. The user first selects a recipe using the display. The recipe may be custom made directly before brewing or preloaded and saved to the device.

2. When the recipe is selected the user will be prompted to fill the milk carafe to a designated level, fill the water tank if empty and insert a tea pod into the pod mechanism. Optionally loose tea and spices may be added in lieu of using a pre-packaged pod containing tea and spices.

3. After the pod is inserted and the lid is closed the pod is punctured and the tea falls into the boiler. The machine will pump the selected volume of water from the reservoir to the boiler using a pump and flow meter under the control of the programmable microprocessor of the device.

4. The water tea leaves and spices will then he heated together using a tubular heater, until the extraction level reaches the level dictated in the recipe. The extraction level is dictated by brew time and temperature as specified in the selected recipe.

5. In parallel with this process, the milk will be heated and textured by an induction heater and a frothing wheel.

6. When both the tea and the milk are sufficiently processed, a solenoid valve on the boiler for the tea will open and the tea will combine with the milk. At this stage the tea latte mixture may be briefly mixed and device will default to a "keep hot" mode. The tea-latte is served from the milk container.

7. The user will be prompted to remove the pod and remove and clean the sieve.

8. The device will be ready for another cycle when the sieve and carafe are sufficiently cleaned, the pod has been removed and the water reservoir is suitable full.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

I. Apparatus and Method for Making Tea Latte with an One Embodiment of the Present Invention Embodiments of the present invention provide an apparatus and method for making tea latte.

Figure 1:
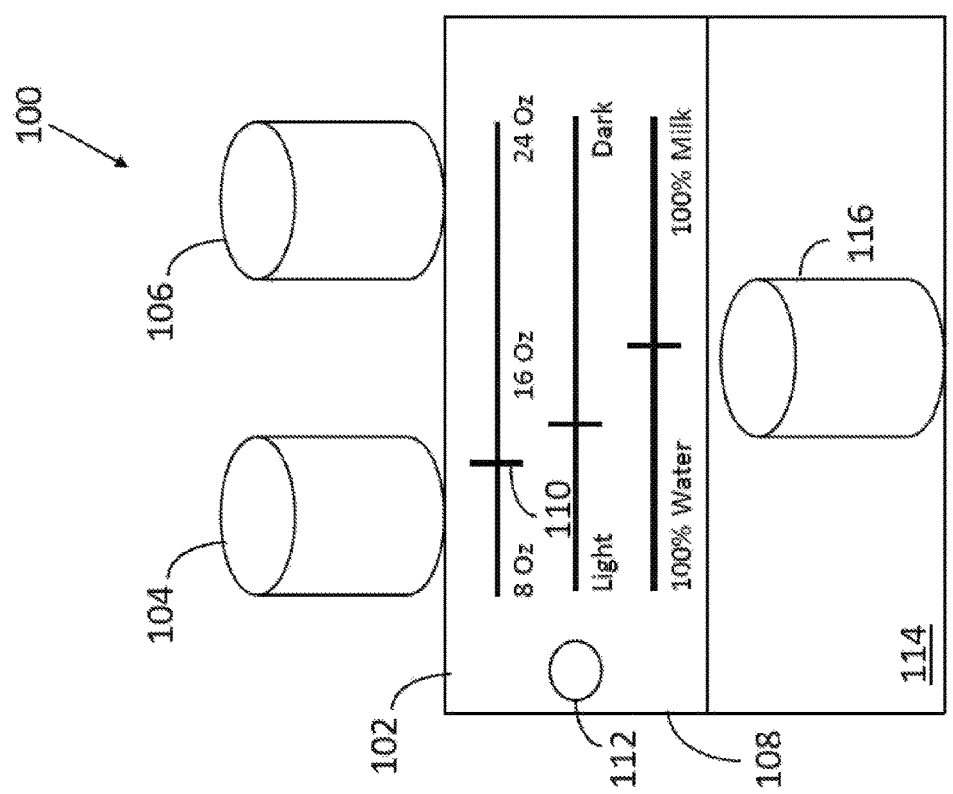
FIG. 1 is a side view of an apparatus configured in accordance with an embodiment of the invention.

FIG. 1 is a side view of an apparatus 100 for preparing tea latte. The apparatus 100 includes a body 102 that supports a first container 104 holding water and a second container 106 holding milk. Either container may be removable. In the case of the container holding milk, it is desirable to have a removable configuration so that unused milk can be placed in a refrigerator. The base of each container has a movable disc (e.g., spring loaded) for engagement with a valve, as discussed below.

The body 102 supports a display 108. The display 108 accepts preparation parameters for tea latte. For example a slider 110 may be used to specify a tea latte serving size. Other sliders may be used to specify the strength of the tea latte (ranging from a light to dark scale). Another slider may be used to specify fluid mixture percentage (ranging from 100% water to 100% milk). The sliders may be mechanical devices. Alternately, display 108 may be a touch display responsive to physical gestures. The display also includes a start button 112. The start button 112 may present process information, such as heating, brewing, ready and the like.

The body 102 defines an aperture 114. A cup 116 may be placed in the aperture to receive brewed tea latte.

Figure 2:
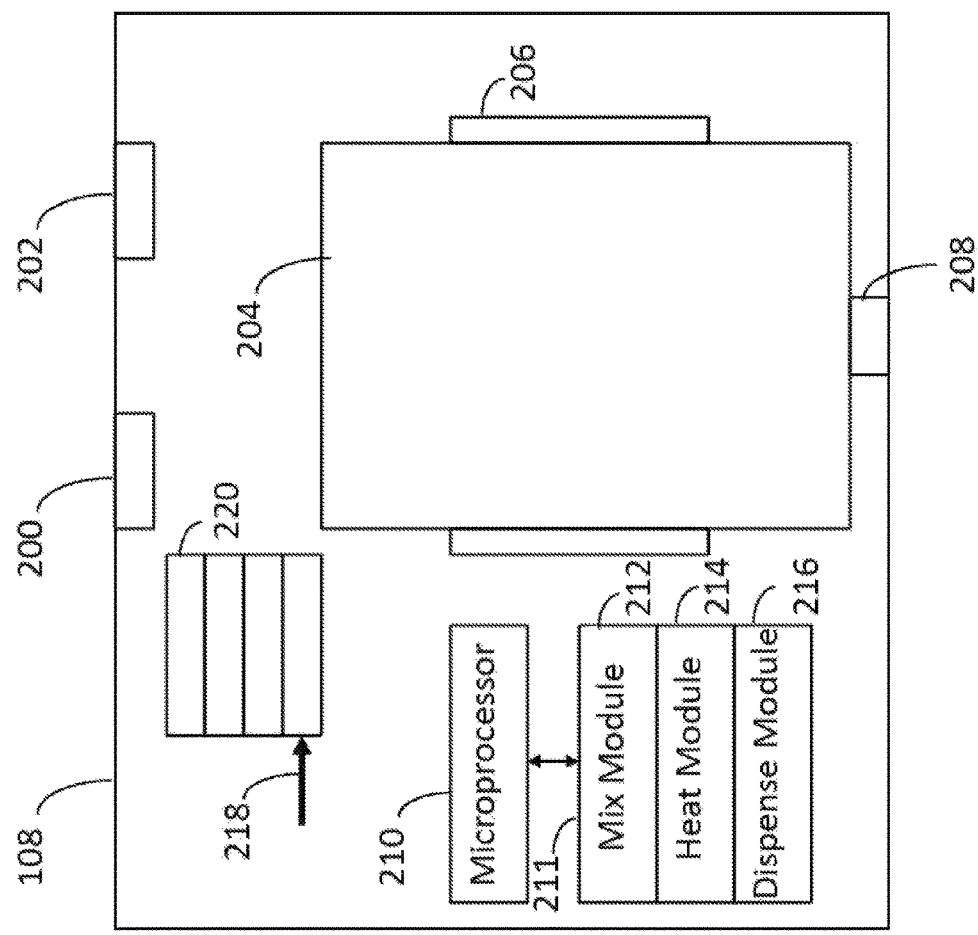
FIG. 2 is an interior view of an apparatus configured in accordance with an embodiment of the invention.

FIG. 2 is an interior view of the apparatus of FIG. 1. The interior view is not to scale. The body includes a first valve 200 to interface with the first container and a second valve 202 to interface with the second container. Fluid from each valve drips into boiler 204. Alternatively, pumps may be used to transport the fluids. Boiler 204 has an associated heater 206. The boiler has a third valve 208 to dispense brewed tea latte. A filter may be positioned between the boiler 204 and valve 208 to trap residue. In one embodiment, the filter is removable.

A microprocessor 210 is connected to a memory 211. The memory 211 stores instructions to control the brewing process. A mix module 212 includes instructions executed by the microprocessor 210 to process a preparation parameter related to percentage of water and milk. The mix module 212 may also include instructions to process a preparation parameter related to serving size.

A heat module 214 includes instructions executed by the microprocessor 210 to control the heater 206 and therefore the brewing process. A dispense module 216 includes instructions executed by the microprocessor 210 to control valves 200, 202 and 208. Thus, the dispense module 216 controls fluid intake to the boiler 204 and the dispensation of tea latte to a cup. An actuator 218 may be controlled by the microprocessor 210 to move a tea cartridge 220 into the boiler 204.

Preferably, the apparatus is configured for some manual operations. For example, the first container and the second container need not be used. Rather, the boiler 204 may be removed from the body 108. A milk, water and tea combination may be prepared in the boiler 204 while outside the body 108. The boiler may then be placed within the body 108. A user may then specify tea latte strength on the interface 108 and push the start button 112.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

Figure 3:
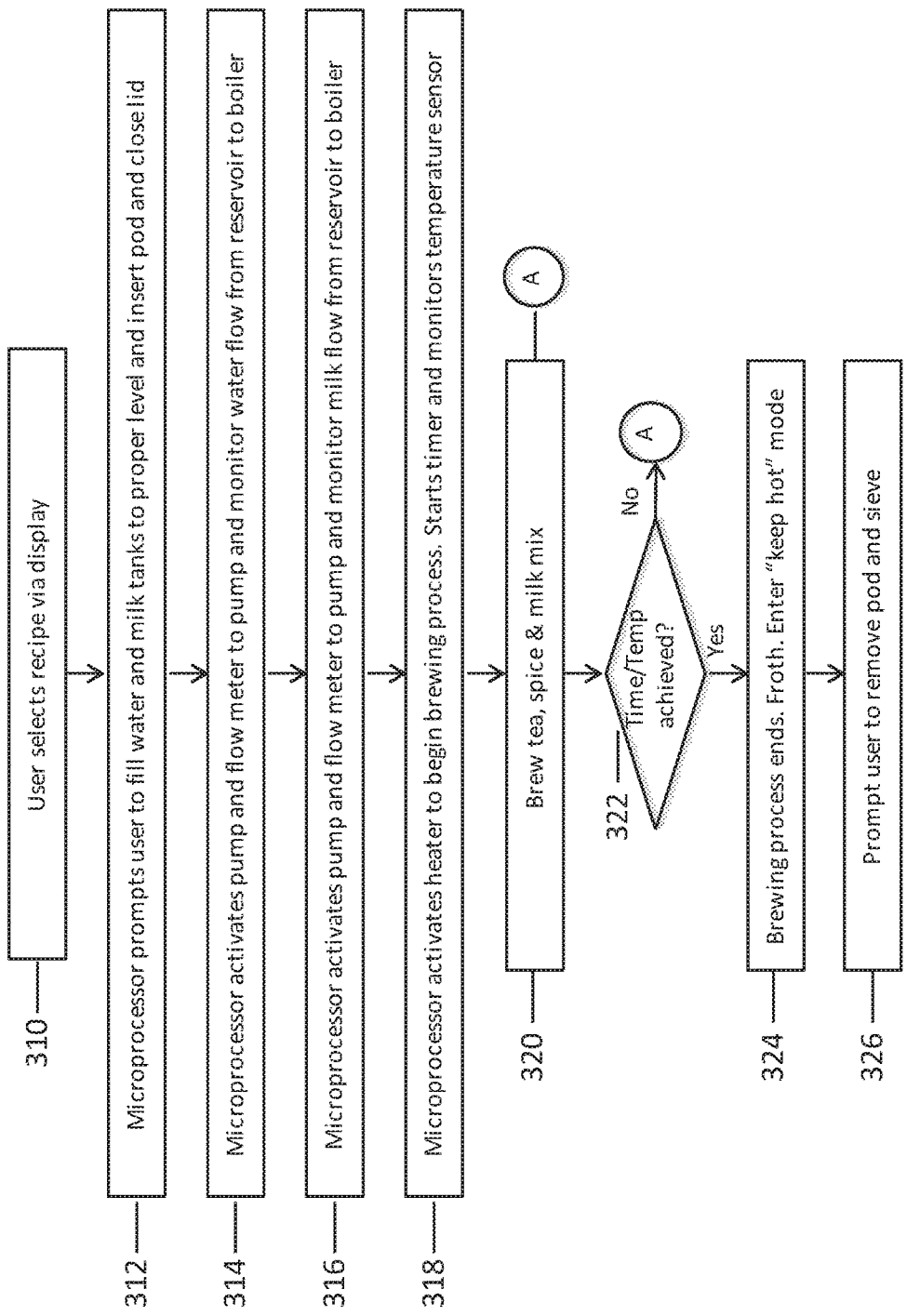
FIG. 3 is a flow diagram of the brew process for an embodiment of the invention with a single heater and boiler, according to one embodiment of the invention.

Now referring to FIG. 3 of the present invention. FIG. 3 is a flow diagram of the brew process for an embodiment of the invention with a single heater and boiler, according to one embodiment of the present invention. The detailed description of the process flow for FIG. 3 will include references to components previously referred to in the detailed description above of FIGS. 1 and 2. In step 310 the user selects a recipe via the display 108. In step 312 once the recipe is selected, the microprocessor 210 prompts the user via the display 108 to fill the water tank 104 and milk tank 106 to their proper levels. In step 312 the microprocessor 210 also prompts the user via the display 108 to insert a pod and close the lid.

Still referring to FIG. 3 of the present invention, in step 314 the microprocessor 210 activates a pump and valve 200 and monitors a flow meter to pump water from the water reservoir 104 into the boiler 204. In step 316 the microprocessor 210 activates a pump and valve 202 and monitors a flow meter to pump milk from the milk reservoir 106 into the boiler 204. In step 318 the microprocessor 210 activates the heater 206 to begin the brewing process. In step 318 the microprocessor 210 starts a timer and begins monitoring temperature in accordance with the recipe selected by the user in step 310.

Still referring to FIG. 3 of the present invention, in xf selected in step 310 have been reached. If not the brewing process continues. If the time and temperature parameters related to the selected recipe have been achieved the process proceeds to step 324.

In step 324 the microprocessor 210 turns the boiler 206 off and the device enters the "keep hot" mode. Optionally at this point, based on the user-selected recipe, the microprocessor 210 activates the frothing mechanism to mix and froth the combined mixture of tea latte and milk. In step 326 the user is prompted to remove the pod and clean the sieve.

II. Apparatus and Method for Making Tea Latte with a Second Embodiment of the Present Invention Embodiments of the present invention provide an apparatus and method for making tea latte. In one embodiment of the present invention, the apparatus includes two heaters and two boilers. One boiler for tea and water is fixed; the second boiler for milk also acts as a removable carafe.

Figure 4:
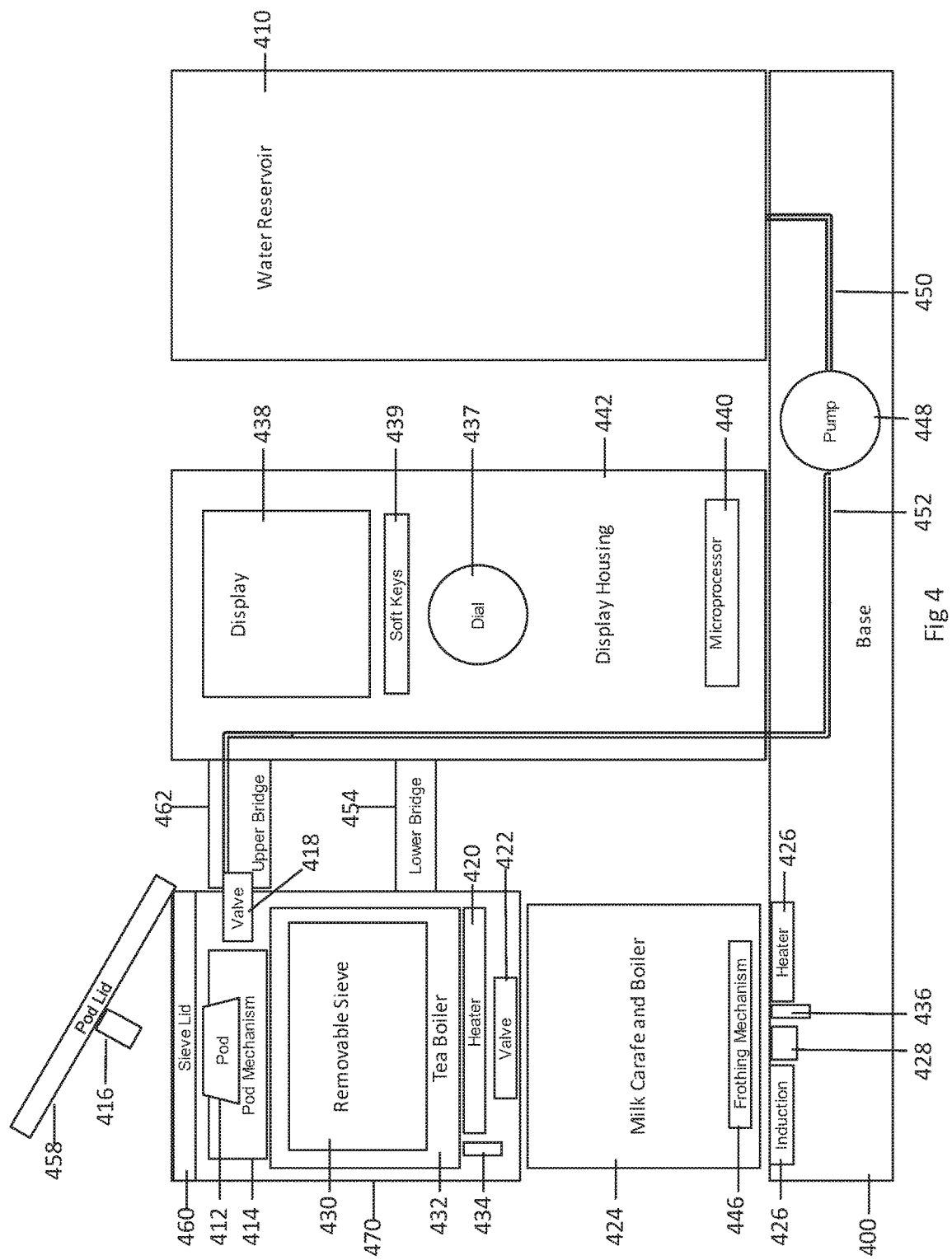
FIG. 4 is a block diagram of the components of a tea latte apparatus consisting of two heaters and two boilers, according to one embodiment of the invention.

Now referring to FIG. 4 of the present invention. FIG. 4 is an overview block diagram of the major components of a tea latte apparatus consisting of two heaters and two boilers, according to one embodiment of the present invention. The block diagram is not to scale.

Still referring to FIG. 4 of the present invention, in one embodiment of the present invention, which includes two boilers, one fixed and one removable and two heaters, the apparatus includes a base 400.

Still referring to FIG. 4 of the present invention, mounted on the base 400 the apparatus includes a water reservoir 410, which the user will be prompted to fill after selecting a recipe if the current water level is insufficient to execute a brew. Connected to the water reservoir 410 is an outgoing water line 450 which is connected to a pump 448 located within the base 400 according to one embodiment of the present invention. Connected to the pump 448 is a water line 452 that supplies water to the tea boiler 432 and is connected to the tea boiler 432 via a valve 418 located near the top of the tea boiler 432 according to one embodiment of the present invention.

Still referring to FIG. 4 of the present invention, according to one embodiment of the invention, the apparatus further contains a brew housing 470, which houses among other components, the pod mechanism 414, the tea boiler 432, the heater 420, the sensor 434, the valve 422 and other sub-components contained within these above mentioned components.

Still referring to FIG. 4 of the present invention, the apparatus further includes a removable sieve 430, into which a tea and spice mix will be dropped via the puncture of a removable pod 412. The removable sieve 430 is placed into and located within the tea boiler 432.

Still referring to FIG. 4 of the present invention, the removable sieve 430 is inserted into the device previous to inserting a removable pod 412. To insert a removable sieve 430 into the device, first the pod lid 458 is raised, then a hollow sieve lid 460 is raised and then the removable sieve 430 is dropped into place in the tea boiler 432.

Still referring to Fig. of the present invention, the apparatus further includes a pod mechanism 414, into which the user will insert a removable pod 412 containing a prepackaged fresh tea and spice mix. In one embodiment of the present invention, the removable pods 412 are constructed of a flexible plastic body and a foil lid. To insert a removable pod 412, the pod lid 458 is raised and a removable pod 412 is inserted with the foil side of the removable pod 412 facing downwards. When the pod lid 458 is closed, the puncture mechanism 416, centered on the bottom of the pod lid 458 presses down on the plastic part of the removable pod 412, which causes the plastic casing of the removable pod 412 to deform and press against and rupture the foil lid of the removable pod 412. This deformation and inversion action is much like turning a sock inside out. When the foil lid of the removable pod 412 is ruptured through this deformation and inversion the tea and spice mix falls into the removable sieve 430, contained within the fixed tea boiler 432.

Still referring to FIG. 4 of the present invention the apparatus further includes a heater 420, under control of the microprocessor 440, for heating the tea boiler 432. In one embodiment of the invention the heater is a tubular heater. The apparatus includes a sensor 434, under control of the microprocessor 440, for monitoring the temperature of the contents of the tea boiler 432. The apparatus further includes a valve 422, under control of the microprocessor 440, for transferring the brewed and filtered spiced tea mix via gravity into the removable combination milk carafe-boiler 424.

Still referring to the present invention the apparatus further includes a removable milk carafe and boiler 424. In one embodiment of the present invention the removable milk carafe and boiler 424 is constructed of tri-ply material, like that used in high-end cookware which allows an even distribution of heat without scorching the milk inside the carafe. Inside the removable milk carafe and boiler 424 is placed a vertical axis centered removable frothing mechanism 446. In one embodiment of the present invention the removable milk carafe and boiler 424 slides into place in a shallow dish platform located in the base 400. The geometry of the shallow dish platform allows the removable milk carafe and boiler to be properly centered such that the magnets located within the frothing mechanism 446 inside of the milk carafe and boiler 424 couple properly with the magnets of the frothing drive mechanism 428 located in the base 400.

Still referring to FIG. 4 of the present invention, in one embodiment of the present invention the apparatus further includes an induction heater 426, under control of the microprocessor 440 located in the base 400 and directly underneath the removable milk carafe and boiler 424 for heating milk within the removable combination milk carafe-boiler 424. The apparatus further includes a sensor 436, under control of the microprocessor 440, for monitoring the temperature of the milk in the removable combination milk carafe-boiler 424. The apparatus further includes a magnet frothing drive mechanism 428 under control of the microprocessor 440, that drives the frothing mechanism 446 inside the milk carafe and boiler 424, for frothing the milk and mixing the final tea latte mixture.

Still referring to FIG. 4 of the present invention, in one embodiment of the invention, the apparatus further includes a display housing 442 attached to the base 400. The display housing 442 includes the user interface display screen 438, user facing soft keys 439, and a combination button/dial 437 all of which are used to control/program the device and all of which are under control of the microprocessor 440. The apparatus further includes a microprocessor 440, which controls all operations, sequencing and coordination of the other sub-components of the present invention. In one embodiment of the present invention the display housing 442 further includes an upper bridge 462 and a lower bridge 454. In one embodiment of the present invention, the functions the bridges are to provide structural support for the tea boiler 432 and pod mechanism 414 as well as to provide conduits for wiring and water lines from the display housing 440 to the tea boiler 432 and the pod mechanism 414.

Figure 5:
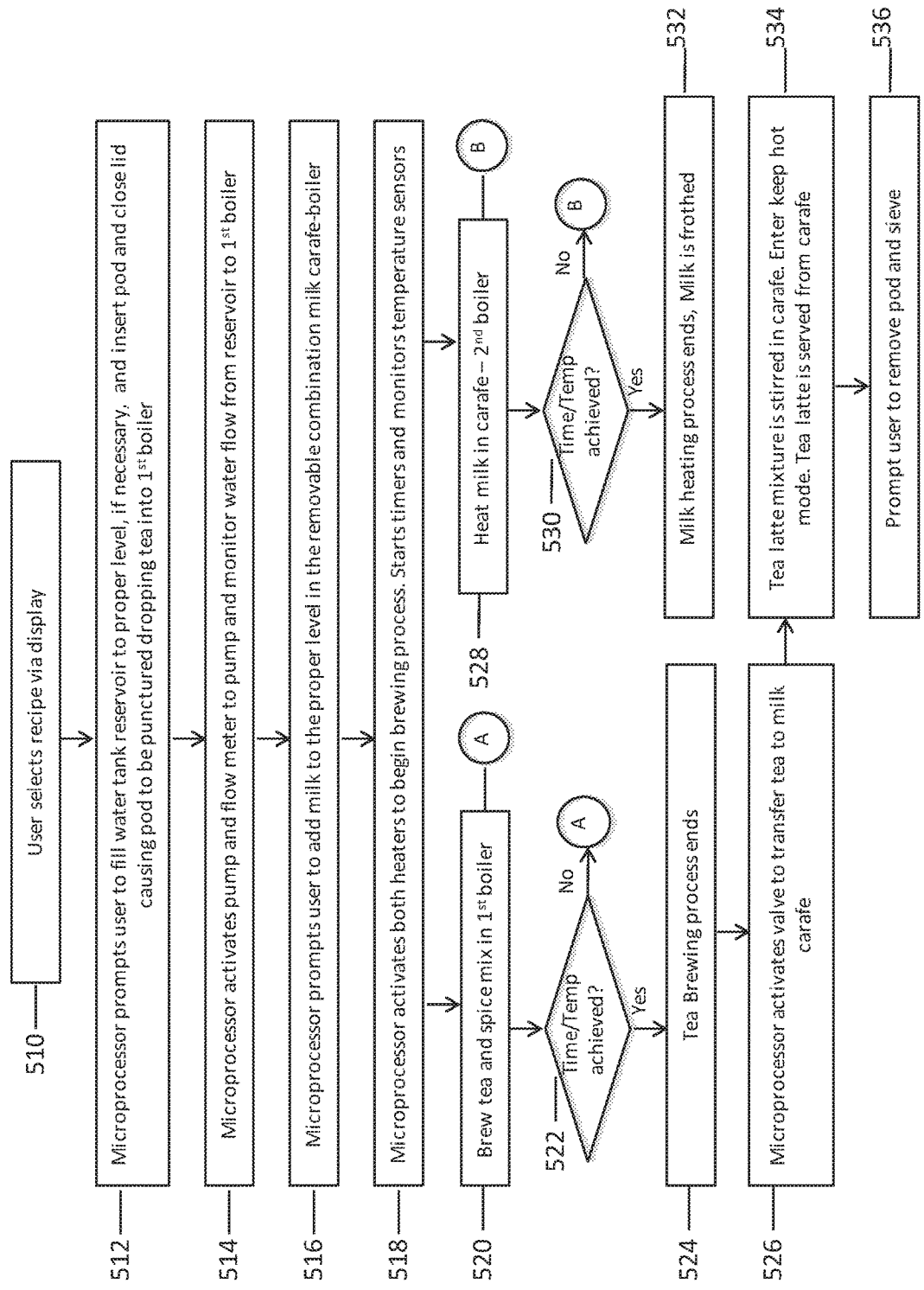
FIG. 5 is flow diagram of the brew process for an embodiment of the invention with two heaters and two boilers, according to one embodiment of the present invention.

Now referring to FIG. 5 of the present invention. FIG. 5 is a flow diagram of the brew process for an embodiment of the invention with two heaters and two boilers, according to one embodiment of the present invention. The detailed description of the process flow for FIG. 5 will include references to components previously referred to in the detailed description of FIG. 4 above. In step 510 the user selects a recipe using the display 438. In step 512 the microprocessor 440 prompts the user to fill the water tank reservoir 410 to the proper level if necessary and insert a removable pod 412 into the pod mechanism 414. In step 514 the microprocessor 440 activates a pump and monitors a flow meter to pump water from the water reservoir 410 to tea boiler 432. In step 516 the microprocessor 440 prompts the user to add milk to the proper level to the removable combination milk carafe-boiler 424. In step 518 the microprocessor 440 activates both heaters 420 and 426 to begin the brewing process of the tea and the heating process of the milk. In step 518 the microprocessor 440 starts timers based on the recipe previously selected by the user. In step 520 the tea and spice mix begins brewing. In step 522 the microprocessor 440 checks if the time and temperature parameters for tea brewing have been reached, if not it continues the brewing process, if so it proceeds to step 524. In step 524 the microprocessor ends the brewing process by turning off the heater 420. In step 528 the milk begins heating. Note the activation of both heaters is done is parallel. In step 530 the microprocessor checks if the time and temperature parameters have been reached for the milk heating, if not it continues, if so it proceeds to step 532. In step 532 the microprocessor ends the milk heating process and optionally froths the milk based on the recipe previously selected by the user. In step 526 the microprocessor 440 activates the valve 422 to transfer the brewed and filtered spiced tea mix via gravity from the tea boiler 432 to the removable combination milk carafe-boiler 424. In step 534, the microprocessor 440 optionally mixes the tea latte mixture dependent upon the recipe previously selected. In step 534 the microprocessor 440 puts the heater 426 for the removable combination milk carafe-boiler 424 in keep hot mode. The tea latte is served from the removable combination milk carafe-boiler 424. In step 536 the microprocessor 440 prompts the user, via the display 438 to remove and clean the removable sieve 430 and remove and discard the removable pod 412.

The foregoing descriptions, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for making tea latte, the apparatus comprising:
   a body;
   a water reservoir;
   a tea dispenser;
   a first boiler configured to contain a sieve such that the sieve is positioned to receive tea from the tea dispenser and water from the water reservoir, the sieve being removable from the first boiler;
   a first heater adjacent to the first boiler to heat water in the first boiler;
   a frothing mechanism;
   a second boiler configured to receive the frothing mechanism, the second boiler further configured to receive milk for frothing, and the second boiler further configured to receive brewed tea from the first boiler, the second boiler being removable from the apparatus;
   a second heater adjacent to the second boiler to heat milk;
   a frothing drive mechanism adjacent to the second boiler for frothing the milk and mixing a tea latte combination, the frothing drive mechanism being configured to drive the frothing mechanism using planar magnetic linkage between the frothing drive mechanism and the frothing mechanism;
   wherein the apparatus is configured to brew tea in the first boiler, froth milk in the second boiler, combine the brewed tea with the frothed milk in the second boiler, and mix the tea latte combination in the second boiler.

2. The apparatus of claim 1, further comprising an actuator configured to cause the tea dispenser to dispense tea into the sieve contained within the first boiler.

3. The apparatus of claim 2, wherein the tea dispenser is configured to accept a removable tea cartridge, the actuator configured to release the contents of the tea cartridge.

4. The apparatus of claim 1, wherein the sieve is configured to be at least partially submerged in water within the first boiler.

5. The apparatus of claim 1, further comprising a first valve configured to release water from the water reservoir into the first boiler.

6. The apparatus of claim 1, further comprising a second valve for releasing the brewed tea from the first boiler into the second boiler.

7. The apparatus of claim 1, further comprising a programmable microprocessor for automated control of the components of the apparatus in brewing the tea, frothing the milk, and mixing tea latte combination.

8. The apparatus of claim 7, further comprising an interface configured to accept at least one preparation parameter for a tea latte wherein the programmable microprocessor automates control of the components of the apparatus in brewing the tea, frothing the milk, and mixing the tea latte combination based on the at least one preparation parameter.

9. The apparatus of claim 7, wherein the programmable microprocessor is configured to prompt a user to add water into the water reservoir, tea into the tea dispenser, and milk into the second boiler.

10. The apparatus of claim 8, wherein the at least one preparation parameter comprises at least one of a tea latte size preparation parameter, a tea latte strength preparation parameter, a percentage water preparation parameter, a milk percentage preparation parameter and a liquid temperature preparation parameter.

11. The apparatus of claim 1 wherein the second heater is a tubular induction heater, the second boiler being removably positioned relative to the tubular induction heater by resting the bottom of the second boiler on a relief on the surface of the apparatus.

12. The apparatus of claim 11 wherein the frothing mechanism rotates about an axis that is centered relative to the induction heater.

* * * * *